W. E. COOK & J. W. MUSGROVE.
VEHICLE TIRE.
APPLICATION FILED FEB. 23, 1912.
1,171,091. Patented Feb. 8, 1916.
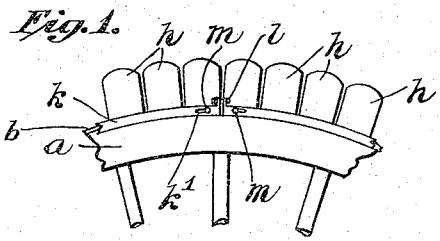
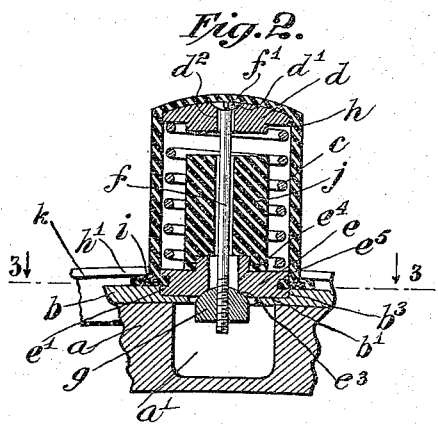
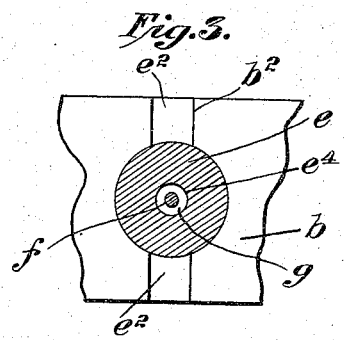
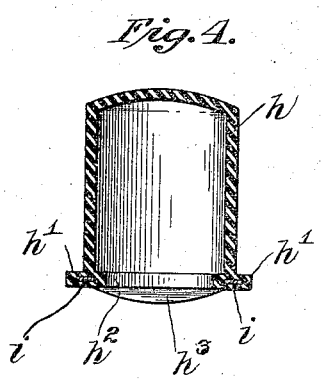
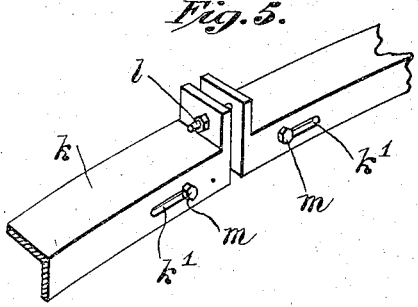
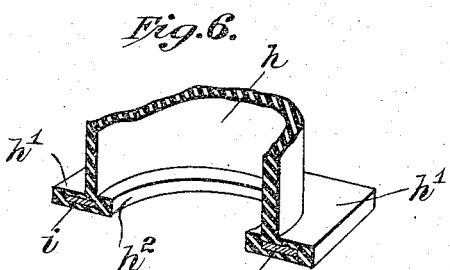
Attest:
William E. Cook
James W. Musgrove
Inventors,
by their Atty.
THE COLUMBIA PLANOGRAPH CO., WASHINGTON, D. C.

UNITED STATES PATENT OFFICE.

WILLIAM E. COOK, OF ST. GEORGE, AND JAMES W. MUSGROVE, OF STAPLETON, NEW YORK.

VEHICLE-TIRE.

1,171,091.      Specification of Letters Patent.      Patented Feb. 8, 1916.

Application filed February 23, 1912. Serial No. 679,250.

*To all whom it may concern:*

Be it known that we, WILLIAM E. COOK, a subject of the King of the United Kingdom of Great Britain and Ireland, and JAMES W. MUSGROVE, a citizen of the United States, residing, respectively, at St. George, in the county of Richmond and State of New York, and at Stapleton, in the county of Richmond and State of New York, have invented certain new and useful Improvements in Vehicle-Tires, of which the following is a specification, reference being had therein to the accompanying drawings, which form a part thereof.

Our invention relates to vehicle tires, and more particularly to a type of resilient tires.

The main object of our invention is to provide a non-collapsible resilient tire which may be used in connection with a wheel of the ordinary construction and may be so adjusted as to present at all points thereof substantially uniform elasticity.

A further object is to provide a tire of this character utilizing metallic springs as the cushioning agent, each spring being so constructed and arranged as to be capable of compression in sustaining the load without developing any stresses upon other springs incorporated in the tire.

A still further object is to provide a tire of this type, which will embody therein a plurality of units, each unit embodying therein a load sustaining spring and being capable of removal from the wheel independently of all other units embodied in the tire.

A still further object is to provide a vehicle tire composed of a plurality of independent units so arranged as to avoid a continuous traction surface or tread, and minimize likelihood of skidding.

A still further object is to provide a vehicle tire composed of a plurality of independent sections, each containing a resilient member, having therein means for securing said sections in position upon a felly in a manner to resist the effects of centrifugal force thereon while at the same time avoiding likelihood of displacement of any section through side stresses occurring upon the tire.

A still further object is to provide a vehicle tire embodying therein a metallic spring for securing the desired cushioning effect, which will be so inclosed by a flexible sheathing as to exclude dust, dirt and moisture from about the spring while at the same time eliminating in a large measure, the noise of impact of the tire with the road.

A still further object is to provide a tire of this character wherein each spring may be so tensioned as to secure uniformity in the cushioning effect of all springs entering into the tire.

A still further object is to provide in connection with a tire of this character, means whereby the spring will have a fixed position relative to the felly, while having sufficient freedom of movement to secure the desired cushioning effect.

A still further object is to provide in a tire of this character supplemental means for sustaining the load, which means will become operative only to relieve the main cushioning springs in case of overloading, or to sustain the load in case of breakage of the main cushioning spring.

A still further object is to provide a tire which may be readily and quickly repaired in case of a breakdown, by the mere removal of one unit and the substitution of another therefor. And a still further object is to provide a tire of this character wherein wear upon the tread will not subject the resilient portion of the tire to likelihood of such injury as would eliminate its cushioning effect and wherein the breaking down of the tire at one point thereof will not result in a loss of the efficiency of the tire as a whole.

The invention consists primarily in a vehicle tire, embodying therein a plurality of closely juxtaposed units, each unit embodying therein a metallic spring, tensioning means whereby the resiliency of each spring may be controlled, and means independent of said spring whereby each unit may be detachably mounted upon a felly; and in such other novel features of construction and combination of parts as are hereinafter set forth and described, and more particularly pointed out in the claims hereto appended.

Referring to the drawings:—Figure 1 is a section of a wheel felly showing our tire applied thereto; Fig. 2 is a vertical section through a single unit, and the portion of the felly adjacent thereto; Fig. 3 is a transverse section adjacent to the felly, illustrating the means of attachment of the spring mechanism with the felly; Fig. 4 is a vertical section of a protecting sheathing circumferentially of the wheel; Fig. 5 is a detail view of a section of the securing rings; and Fig. 6 is a detail view of the base of said sheathing.

Like letters refer to like parts throughout the several views.

In the embodiment of our invention shown in the drawings, $a$ indicates a portion of an ordinary felly having a reinforcing metallic rim $b$. About this felly are a plurality of sockets or chambers $a'$ extending only partially through the felly so as to prevent dust and dirt from entering said sockets or chambers and filling them in a manner to interfere with the free movement of the cushioning members. The rim $b$ has a plurality of openings $b'$ extending therethrough, and opening into a socket or chamber $a'$ respectively, and upon the outer face of the rim $b$ adjacent to each opening $b'$ we form a transverse channel $b^2$ to facilitate the mounting of the cushioning mechanism. The openings $b'$ have a countersink therein as shown at $b^3$.

The sockets or chambers $a'$ are arranged symmetrically about the entire felly and in conjunction with each such socket we employ a cushioning unit. As the construction of all these units will be identical, a description of but one of them will be entered into. The various units are closely juxtaposed in a manner to form a complete tread comprised of a plurality of traction surfaces spaced slightly apart so as to avoid continuity of the surface of the tread and minimize skidding which occurs when tires having a continuous tread are used.

Each unit comprises a coiled steel spring $c$ of a strength sufficient to sustain the desired load. At opposite ends of this spring are plates $d$ and $e$, the former of which is semi-spherical and serves as a wear plate adapted to have a rolling impact with the road, as well as to distend and support the sheathing which will be hereinafter described; and the latter of which is adapted to aid in maintaining the proper position of the unit upon the felly. The plate $e$ has a cylindrical portion $e'$ adapted to enter the countersink $b^3$ to prevent creeping upon the felly, and side wings $e^2$ adapted to enter the channel $b^2$ and serve as retaining means for holding this plate firmly upon the felly in assembling the tire. Both plates $d$ and $e$ upon the opposite faces thereof are provided with curved countersinks $d'$ $e^3$ and extending therethrough respectively, are the bores $d^2$ and $e^4$. Extending through said bores and through the springs $c$ is a tie rod $f$ having a rounded head $f'$. Mounted upon the rod $f$ is a rounded adjustment nut $g$. The spring $c$ is seated between the plates $d$ and $e$.

It will be observed that those parts entering into the unit may be completely assembled without being attached to a tire, and that the spring of each may be tensioned in a manner to impart thereto a certain predetermined resiliency, thus making it possible to secure uniformity in the resiliency of all units entering into the tire. The curved head and nut permit slight play of the tie rod $f$ in any direction and thus relieve said rod in great measure of breaking strains.

A unit when thus assembled is absolutely independent of every other unit entering into the tire, and may be attached to and removed from the felly without disturbing or affecting the adjustment of any other unit.

The end of the tie rod $f$ and the nut $g$ thereon are adapted to be seated and to have free movement in the socket or chamber $a'$ this chamber serving to protect this mechanism in a manner to insure reliability in the cushioning action of the said spring $c$.

To exclude from the spring mechanism, the elements, dust and dirt, and at the same time present a sound absorbent body between said mechanism and the road, we inclose each unit with a flexible cup-shaped sheathing $h$ having a base flange $h'$ thereon to facilitate its attachment relative to its spring unit and the felly. This sheathing is preferably composed of rubber reinforced by fabric, the sides thereof being highly flexible so as to facilitate the movement of the spring in developing the desired cushioning effect. To eliminate possibility of the separation of the protecting cover from the felly, we preferably embed in the flange thereof a metallic plate as $i$ which serves to stiffen this flange.

Inasmuch as the flanged portions of the caps $h$ will be closely juxtaposed, thus preventing the utilization of any special means for binding the fore and rear edges thereof upon the felly, and inasmuch as the curve of the felly would tend to leave an opening about a cup having straight front and rear walls, we provide these walls with tongues $h^2$ adapted to seat upon the felly and to be forced toward the adjacent sheathings as the securing means are applied to the tire, in a manner to form a weatherproof joint between abutting units.

To assist in positioning and holding the units $h$ relative to the spring mechanisms constituting therewith a spring unit, we form the plate $e$ with a circumferential groove $e^5$ and provide said cap or sheathing with an interior tongue or flange $h^2$ adapted to be sprung into said groove.

To guard against an excessive cushioning effect upon, or a complete collapse of any unit, which might occur in case of overloading or breakage of the spring, we nest within the said spring $c$ and upon the tie rod $f$ a resilient buffer $j$ having relatively less elasticity than said spring; so that when the plate $d$ has passed a certain point, this buffer will assume the load. Preferably this buffer is composed of a rubber block as shown in the drawings.

Adapted to be secured upon each side of the felly $a$ are angular clamp rings $k$ one flange of which is adapted to fit upon one side of the felly and the other flange of which is adapted to engage and compress the flanges $h'$ of the various sheathings $h$ upon the rim $b$ and to secure the wings $e^2$ carried by the plates $e$. Each ring is preferably made up of a plurality of sections, the ends of which are adapted to be united by means of take up bolts $l$ which also serve to draw said sections together to contract the rings sufficiently to develop the requisite pressure. The movement required to accomplish this result is very slight, and to compensate for this slight movement, we provide each section with an elongated slot as $k'$ through which and the felly passes one or more bolts $m$. It will be observed that by the use of clamp rings as described, not only are the various sheathings $h$ secured in position upon the felly and in relation to their spring cushioning mechanism, but each spring mechanism itself is confined to a fixed position relative to the felly through the fact that one flange of said ring overlaps the wings $e^2$ of the plate $e$.

Any creeping of any unit about the felly is, by the construction described, made impossible and in case of an absolute loss of the sheathing, the spring mechanism of any unit will remain in its position upon the felly so that the wear plate $d$ may be utilized as a portion of the tread without sacrificing the resiliency of the tire at that point.

The plates $d$ and the tie rod $f$ will insure the proper distribution of the load upon the springs $c$ to avoid the development of side stresses or the buckling of the springs, thus preventing the accidental displacement of any unit through excessive side pressures thereon.

No loss of efficiency in the cushioning effect of any unit entering into the tire can result from any cause whatever, excepting a complete breakdown of the spring or an overloading of the vehicle, and by reason of the means provided for adjusting the tension of the spring before placing it in a tire, the tire may be adjusted to sustain varying loads and its cushioning effect may be made uniform throughout. The sheathing $h$ is used merely to avoid excessive noise from the tire and to exclude the elements, dust and dirt from the springs and from the sockets or chambers $a'$. This sheathing is subjected to no strains whatever from the springs, the entire outward thrust of the said springs being absorbed by the tie rod $f$ and the plate $e$. This last named plate also serves to distend the face of the said sheathing.

If it be found necessary for any reason to substitute one unit for another, this may be quickly done by bringing the unit to be removed to the top of the wheel and removing that section of the ring $k$ acting upon such unit, loosening the ring upon the opposite side of the wheel, slipping this unit out in its entirety, and substituting another unit therefor and replacing the ring. This operation may be quickly performed, and the tire after the substitution of this new unit will require no further alteration or adjustment. In an emergency, a broken unit need not be replaced, as the adjoining units will act to assume the load without material discomfort to the occupants of the vehicle.

By the construction herein described, we provide a vehicle tire, composed of a plurality of entirely independent units embodying therein a spring cushioning element, each unit occupying a predetermined position upon the felly and not being capable of displacement through the breaking down of adjoining units.

Throughout the specification we have referred to a spring cushioning mechanism, and this term is applied to the spring $c$ itself, the plate $d$ and the tie rod $f$ for controlling the tension of said spring. The plate $e$ while serving as a resistance for tensioning the springs, is primarily designed to locate and secure the spring mechanism relative to the felly.

It is not our intention to limit the invention in its broader aspects to the precise details of construction shown in the drawings, it being apparent that such may be varied without departing from the spirit and scope of the invention.

Having described our invention, what we claim as new and desire to have protected by Letters Patent, is:—

1. A vehicle tire embodying therein a felly, a plurality of closely juxtaposed independent units extending circumferentially about said felly, said units being spaced apart and respectively embodying therein a plate adapted to seat upon said felly, a tie rod slidably mounted in said plate, a wear plate carried by and movable with said rod, a metallic spring seated between said first named plate and said wear plate, means carried by said rod acting upon said first named plate whereby said spring may be tensioned and held in tension and said plates and said spring will be permanently assembled, and a flexible sheathing inclosing said spring and conforming to and engaging said wear plate, and a ring coöperating with the first named plate and the sheathing of all units upon a felly to maintain said units in position thereon.

2. A vehicle tire embodying therein a felly, a plurality of closely juxtaposed independent units extending circumferentially about said felly, said units being spaced apart and respectively embodying therein a plate adapted to seat upon said felly, a tie rod slidably mounted in said plate, a wear plate carried by and movable with said rod, a metallic spring seated between said first named plate and said wear plate, said rod having screw threads thereon, a nut adjustably mounted upon said screw thread and coöperating with said first named plate whereby said spring may be tensioned and held in tension and said plates and said spring will be permanently assembled, and a flexible sheathing inclosing said spring and conforming to and engaging said wear plate and a ring coöperating with the first named plate and the sheathing of all units upon a felly to maintain said units in position thereon.

3. A vehicle tire embodying therein a felly, a plurality of closely juxtaposed independent units extending circumferentially about and spaced apart upon said felly, each of said units embodying therein a metallic spring, a plate adapted to seat upon said felly, a tie rod slidably mounted in said plate, a wear plate carried by and movable with said rod, means carried by said rod whereby said spring may be tensioned and held in tension, and coöperating with said first named plate, a cup-like flexible casing adapted to inclose said spring and to bear upon and engage said wear plate, said sheathing having laterally extending flanges bearing upon said first named plate and a reinforcing metallic plate extending about said sheathing and embedded in said flange, and a ring adapted to engage the top of said reinforced flange, and clamp said flange and said first named plate in position upon said felly.

4. A vehicle tire embodying therein a felly having a series of recesses upon the outer face thereof, a plurality of closely juxtaposed independent units each embodying therein a plate adapted to enter one of the recesses upon said felly and be held thereby against circumferential movement about the felly, a tie rod slidably mounted in said plate, a wear plate carried by said tie rod, a coiled metallic spring seated between said first named plate and said wear plate and a take-up nut carried by said tie rod and operatively engaging said first named plate, whereby the tension of said spring may be regulated and the parts of each unit are united and means whereby the units composing the tire may be detachably mounted upon the felly.

5. A vehicle tire, embodying therein a plurality of closely juxtaposed units, each unit embodying therein a coiled spring, a wear plate upon one end thereof, an oppositely disposed plate adapted to occupy a fixed position upon a felly said plate having laterally projecting wings or projections whereby said last named plate may be clamped thereon, a tie rod carried by said wear plate and slidably mounted in said oppositely disposed plate, a take-up nut whereby the tension of said spring may be controlled, and a cup-like flexible sheathing adapted to inclose said spring, and means adapted to engage said wings or projections whereby each unit may be detachably mounted upon a felly.

6. A vehicle tire, embodying therein a plurality of closely juxtaposed units each unit embodying therein a coiled spring, a wear plate upon one end thereof, an oppositely disposed plate adapted to occupy a fixed position upon a felly, said plate having laterally projecting wings or projections whereby it may be clamped upon a felly, a tie rod carried by said wear plate and slidably mounted in said oppositely disposed plate, a take-up nut whereby the tension of said spring may be controlled, and a cup-like flexible sheathing adapted to inclose said spring, said sheathing having laterally extended flanges adapted to be engaged by the means securing the unit upon a felly, and said flanges having embedded therein a reinforcing metallic plate, and means adapted to engage said reinforced flanges and said wings or projections whereby each unit may be detachably mounted upon a felly.

7. A vehicle tire embodying therein a felly having a series of sockets or chambers about the periphery thereof, means forming a reduced outlet opening for each socket or chamber and a countersink about the outer edge of said opening, a cushioning mechanism comprising a plurality of closely juxtaposed independent units each embodying therein a plate adapted to enter one of said countersinks whereby circumferential movement of said plate is prevented a tie rod slidably mounted in and projecting through said plate into said socket or chamber, a wear plate upon the outer end of said tie rod, a coiled spring seated between said first named plate and said wear plate and means carried by said rod and acting upon said first named plate whereby said spring may be tensioned and held in tension, and means adapted to detachably secure all of said units upon a felly.

8. A vehicle tire, embodying therein a felly having a plurality of sockets or chambers therein, a reduced outlet opening for each of said sockets or chambers, a channel extending laterally across said opening, and a cushioning mechanism comprising a unit embodying therein a coiled spring, a wear plate at one end thereof, an oppositely disposed plate having laterally projecting wings or projections adapted to enter said channel whereby said last named plate may be clamped upon a felly, a tie rod carried by said wear plate and slidably mounted in said oppositely disposed plate and projecting into said socket or chamber, and a take-up nut upon the end of said rod whereby the tension of said spring may be controlled, and means adapted to engage said wings or projections whereby each unit may be detachably mounted in a fixed position upon a felly.

In witness whereof, we have hereunto affixed our signatures in the presence of two subscribing witnesses, this 31st day of January, 1912.

WILLIAM E. COOK.
JAMES W. MUSGROVE.

Witnesses:
OTTO MUNK,
F. T. WENTWORTH.

Copies of this patent may be obtained for five cents each, by addressing the "Commissioner of Patents, Washington, D. C."